(12) United States Patent
Zeng et al.

(10) Patent No.: US 12,119,672 B2
(45) Date of Patent: Oct. 15, 2024

(54) ELECTROMAGNETIC FIELD TRANSCEIVER DEVICE AND WIRELESS CHARGING DEVICE

(71) Applicant: DELTA ELECTRONICS (SHANGHAI) CO., LTD., Shanghai (CN)

(72) Inventors: Jianhong Zeng, Shanghai (CN); Benze Zou, Shanghai (CN); Tao Ye, Shanghai (CN); Lei Zhang, Shanghai (CN); Shun Zhang, Shanghai (CN)

(73) Assignee: DELTA ELECTRONICS (SHANGHAI) CO., LTD., Shanghai (CN)

( * ) Notice: Subject to any disclaimer, the term of this patent is extended or adjusted under 35 U.S.C. 154(b) by 663 days.

(21) Appl. No.: 17/322,473

(22) Filed: May 17, 2021

(65) Prior Publication Data

US 2021/0367455 A1 Nov. 25, 2021

(30) Foreign Application Priority Data

May 22, 2020 (CN) .......................... 202010441941.4

(51) Int. Cl.
*H05K 5/03* (2006.01)
*H02J 50/10* (2016.01)
*H02J 50/70* (2016.01)

(52) U.S. Cl.
CPC .............. *H02J 50/70* (2016.02); *H02J 50/10* (2016.02)

(58) Field of Classification Search
CPC ..... H05K 5/0217; H05K 5/0017; H05K 5/003
(Continued)

(56) References Cited

U.S. PATENT DOCUMENTS 9,554,483 B2 * 1/2017 Fink ........................ H05K 5/069
2002/0172476 A1 * 11/2002 Nagase ................ G02B 6/4246
385/94
(Continued)

FOREIGN PATENT DOCUMENTS

CN 103109591 A 5/2013
CN 103369938 A 10/2013
(Continued)

OTHER PUBLICATIONS

Japanese Office Action for Application No. 2021-087177, mailed May 31, 2022 (3 pages).

*Primary Examiner* — Hung S. Bui
(74) *Attorney, Agent, or Firm* — NIXON PEABODY LLP

(57) ABSTRACT

The present disclosure provides an electromagnetic field transceiver device and a wireless charging device, including: a cover body, a selective shielding cover, a sealing ring and a transceiver unit. The selective shielding cover is provided with an electromagnetic field transceiver window that selectively shields an electric field and/or a magnetic field. The sealing ring sleeves the cover body. The selective shielding cover is seamlessly connected to an opening of the cover body relative to the electric field or the magnetic field through the sealing ring, the selective shielding cover and the cover body form a cavity. The sealing ring is electrically connected to the selective shielding cover, and the sealing ring encloses the electromagnetic field transceiver window. The transceiver unit is provided in the cavity. The transceiver unit is configured to receive or transmit a target electromagnetic field.

20 Claims, 13 Drawing Sheets

(58) Field of Classification Search
USPC ....... 361/816, 818, 728, 752, 796, 800, 807, 361/809, 810
See application file for complete search history.

(56) References Cited

U.S. PATENT DOCUMENTS

| | | | |
|---|---|---|---|
| 2017/0220074 | A1 | 8/2017 | Cooper et al. |
| 2018/0062440 | A1 | 3/2018 | Singh et al. |
| 2019/0077177 | A1 | 3/2019 | Hawthorne et al. |
| 2019/0082546 | A1 | 3/2019 | Rammah et al. |
| 2020/0060050 | A1* | 2/2020 | Ohkubo ............... H05K 5/0017 |

FOREIGN PATENT DOCUMENTS

| | | |
|---|---|---|
| CN | 103687461 A | 3/2014 |
| CN | 203872502 U | 10/2014 |
| CN | 204966916 U | 1/2016 |
| CN | 106229131 A | 12/2016 |
| CN | 107404005 A | 11/2017 |
| CN | 107946286 A | 4/2018 |
| CN | 108226585 A | 6/2018 |
| CN | 207835116 U | 9/2018 |
| CN | 207869114 U | 9/2018 |
| CN | 109155183 A | 1/2019 |
| CN | 109155303 A | 1/2019 |
| CN | 208580741 U | 3/2019 |
| CN | 208622565 U | 3/2019 |
| CN | 209046316 U | 6/2019 |
| CN | 110290687 A | 9/2019 |
| CN | 209594203 U | 11/2019 |
| CN | 110880803 A | 3/2020 |
| CN | 111095731 A | 5/2020 |
| JP | 5-308198 A | 11/1993 |
| JP | 2011-82985 A | 4/2011 |
| JP | 2019179909 A | 10/2019 |
| JP | 2019-534669 A | 11/2019 |
| TW | 201042674 A | 12/2010 |
| TW | 201838139 A | 10/2018 |
| WO | 2019187708 A1 | 10/2019 |

* cited by examiner

ELECTROMAGNETIC FIELD TRANSCEIVER DEVICE AND WIRELESS CHARGING DEVICE

CROSS REFERENCES TO RELATED APPLICATION

The present application claims priority to Chinese patent application No. 202010441941.4, filed on May 22, 2020, the content of which is hereby incorporated by reference in its entirety.

TECHNICAL FIELD

The present disclosure relates to the field of wireless charging technology, and particularly to an electromagnetic field transceiver device and a wireless charging device.

BACKGROUND

With the development of the society and the improvement of people's living standards, electronic products and electric appliances have been widely used, and the problem of electromagnetic interference is getting more and more attention of the people. A high-power electromagnetic radiation not only interferes with other electronic devices around, but also harms human beings, animals and plants, thus the electromagnetic shielding of the electronic products in the design process thereof is particularly important.

At present, a metal shell is commonly used for electromagnetic shielding, which uses the metal electromagnetic shielding to form an electromagnetically closed cavity, and the electric and magnetic fields inside the cavity cannot penetrate the metal shell. However, in some electromagnetic field transmission occasions, such as wireless charging field and other fields, the wireless charging device needs to use a magnetic field to transmit energy to a device that needs to be charged. Therefore, a part of region in the wireless charging device is required to allow partial magnetic fields to pass through, but cannot exceed a relevant electromagnetic shielding standard.

At present, in the existing wireless charging transmitter or receiver devices, since an area of a coil is the largest and a voltage jump is the most obvious, a shielding layer only shields the electric field emitted by the coil, accordingly the protection against the magnetic field is limited.

SUMMARY

In view of this, as for the problem that a shielding layer in the existing wireless charging transmitter or receiver device only shields the electric field emitted by the coil, and accordingly the protection against the magnetic field is limited, then it is necessary to provide an electromagnetic field transceiver device and a wireless charging device.

An electromagnetic field transceiver device includes:
a cover body;
a selective shielding cover, provided with an electromagnetic field transceiver window which selectively shields an electric field and/or a magnetic field;
a sealing ring, the selective shielding cover being seamlessly connected to an opening of the cover body relative to the electric field or the magnetic field through the sealing ring, the selective shielding cover and the cover body forming a cavity, the sealing ring being electrically connected to the selective shielding cover, and the sealing ring enclosing the electromagnetic field transceiver window; and
a transceiver unit, provided in the cavity and configured to receive or transmit a target electric field and/or the magnetic field.

A wireless charging device includes: the electromagnetic field transceiver device of any one of the above embodiments, the selective shielding cover is connected to the opening of the cover body in a sealing manner; and
a driving circuit, provided in the cavity and electrically connected to the transceiver unit, and configured to drive the transceiver unit to receive or transmit the target electric field and/or the magnetic field through the electromagnetic field transceiver window.

Compared to the prior art, in the above electromagnetic field transceiver device and wireless charging device, the selective shielding cover in the present disclosure is seamlessly connected to an opening of the cover body relative to the electric field or the magnetic field through the sealing ring, and forms a closed cavity capable of shielding the electromagnetic interference other than from the target electromagnetic field. At the same time, the selective shielding cover is provided with the electromagnetic field transceiver window, and the transceiver unit is provided in the cavity, so that the transceiver unit can receive or transmit the target electromagnetic field through the electromagnetic field transceiver window. With the above structure, the present disclosure can not only realize the smooth transmission function of the target electromagnetic field, but also has an excellent effect of shielding the electromagnetic interference, and has a strong adaptability.

BRIEF DESCRIPTION OF THE DRAWINGS

In order to more clearly illustrate the technical solutions in the embodiments of the present disclosure or the conventional art, the accompanying drawings used in the description of the embodiments or the conventional art are briefly introduced below. Obviously, the accompanying drawings in the following description are merely several embodiments of the present disclosure, and those of ordinary skill in the art can obtain other drawings from these accompanying drawings without creative work.

DETAILED DESCRIPTION

In order to make the above purposes, features and advantages of the present disclosure more apparent and better understood, embodiments of the present disclosure will be detailed hereinafter with reference to the accompanying drawings. In the following description, many specific details are illustrated in order to fully understand the present disclosure. However, the present disclosure can be implemented in many other ways different from those described herein, and a person skilled in the art can make similar improvements without departing from the concept of the present disclosure, and therefore, the present disclosure is not limited by the specific embodiments disclosed below.

It should be noted that when an element is referred to as being "fixed to" another element, it can be directly fixed to another element or indirectly fixed to another element through an intermediate element. When an element is considered to be "connected to" another element, it can be directly connected to another element or indirectly connected to another element through an intermediate element.

All technical and scientific terms used herein have the same meaning as commonly understood by one of ordinary skill in the art to which the present disclosure applies, unless otherwise defined. The terms used in the specification of present disclosure herein are for the purpose of describing specific embodiments only and are not intended to limit the present disclosure. The term "and/or" used herein includes any and all combinations of one or more of the associated listed items.

Figure 1:
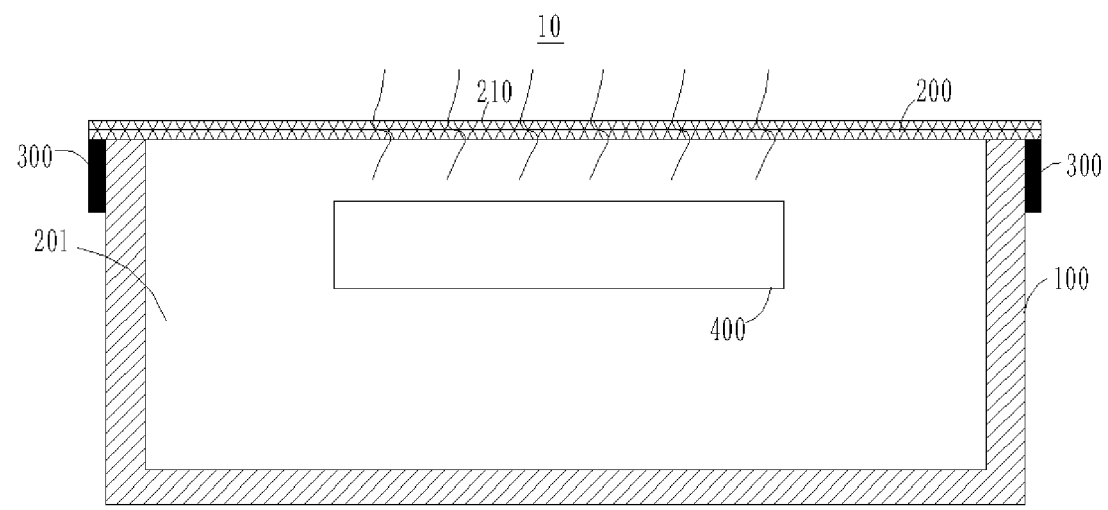
FIG. 1 is a structure block diagram of an electromagnetic field transceiver device according to an embodiment of the present disclosure.

Referring to FIG. 1, an embodiment of the present disclosure provides an electromagnetic field transceiver device 10, including a cover body 100, a selective shielding cover 200, a sealing ring 300 and a transceiver unit 400. The selective shielding cover 200 is provided with an electromagnetic field transceiver window 210 that selectively shields an electric field and/or a magnetic field. The selective shielding cover 200 is seamlessly connected to an opening of the cover body 100 relative to the electric field and/or the magnetic field through the sealing ring 300; and the selective shielding cover 200 and the cover body 100 form a cavity 201. The sealing ring 300 is electrically connected to the selective shielding cover 200, and the sealing ring 300 encloses the electromagnetic field transceiver window 210. The transceiver unit 400 is provided in the cavity 201. The transceiver unit 400 is configured to receive or transmit a target electromagnetic field.

It can be appreciated that a material of the cover body 100 is not limited, as long as the cover body 100 and the selective shielding cover 200 can form the cavity 201 through the sealing ring 300. In an embodiment, the material of the cover body 100 can be a non-shielding material, such as plastic. In an embodiment, the material of the cover body 100 can also be a shielding material, such as aluminum, copper, iron, and the like metal material.

In an embodiment, the selective shielding cover 200 can be a Printed Circuit Board (PCB) board including a shielding layer. The selective shielding cover 200 is provided with an electromagnetic field transceiver window 210 which selectively shields an electric field and/or a magnetic field. A size of the electromagnetic field transceiver window 210 is not limited, as long as that the sealing ring 300 can enclose the electromagnetic field transceiver window 210.

In an embodiment, that the selective shielding cover 200 is seamlessly connected to the opening of the cover body 100 relative to the electric field and/or the magnetic field through the sealing ring 300 refers to: a seamless connection with respect to the electric field and/or magnetic field is formed between the sealing ring 300 and the selective shielding cover 200, while a seamless connection with respect to the electric field and/or magnetic field is formed between the sealing ring 300 and the opening of the cover body 100. The step of forming the seamless connection with respect to the electric field and/or magnetic field refers to: a gap between the sealing ring 300 and the opening of the cover body 100, and a gap between the sealing ring 300 and the selective shielding cover 200 are small enough that an electric field and/or a magnetic field of a frequency band that needs to be shielded by the electromagnetic field transceiver device 10 cannot pass through obviously. The sealing ring 300 is seamlessly connected to the opening of the cover body 100 and the selective shielding cover 200 to implement the shielding function. In an embodiment, the sealing ring 300 and the selective shielding cover 200 can be formed in one piece.

Figure 2:
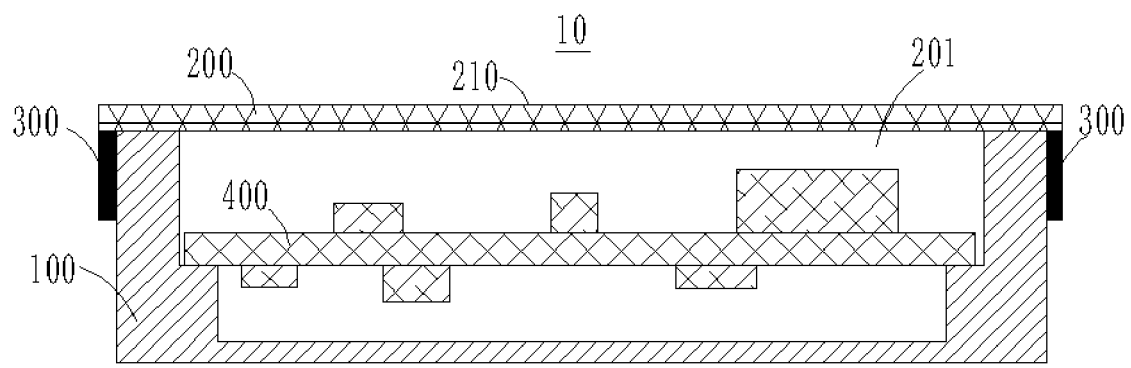
FIG. 2 is a cross-sectional view I of an electromagnetic field transceiver device according to an embodiment of the present disclosure.

In an embodiment, the implementation method of the seamless connection between the sealing ring 300 and the opening of the cover body 100 is not limited, as long as that the selective shielding cover 200 and the cover body 100 can form a cavity 201 by using the sealing ring 300. In an embodiment, as shown in FIGS. 1 and 2, the sealing ring 300 sleeves the cover body 100. Specifically, the sealing ring 300 is coaxially arranged with the cover body 100, and the sealing ring 300 is seamlessly connected to a side wall of the cover body 100 away from the transceiver unit 400. Further, the sealing ring 300 can be arranged to directly attach to the side wall of the cover body 100. In an embodiment, the cover body 100 includes at least one side edge forming the opening, and one end of the at least one side edge connected to the sealing ring 300 includes at least one groove. That is, the sealing ring 300 can also be provided in the groove, and matched with the selective shielding cover 200 and the cover body 100 to form the cavity 201 capable of shielding an electromagnetic interference other than from the target electromagnetic field. By providing the transceiver unit 400 in the cavity 201, a smooth transmission function of the target electromagnetic field can be implemented, and an excellent effect of shielding the electromagnetic interference is achieved.

Figure 3:
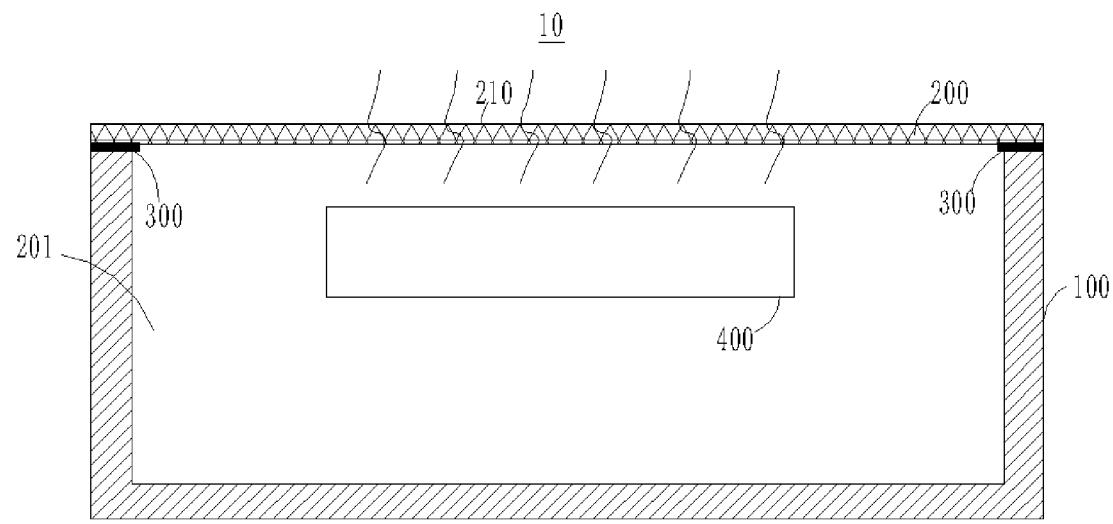
FIG. 3 is a structure block diagram of an electromagnetic field transceiver device according to another embodiment of the present disclosure.
Figure 4:
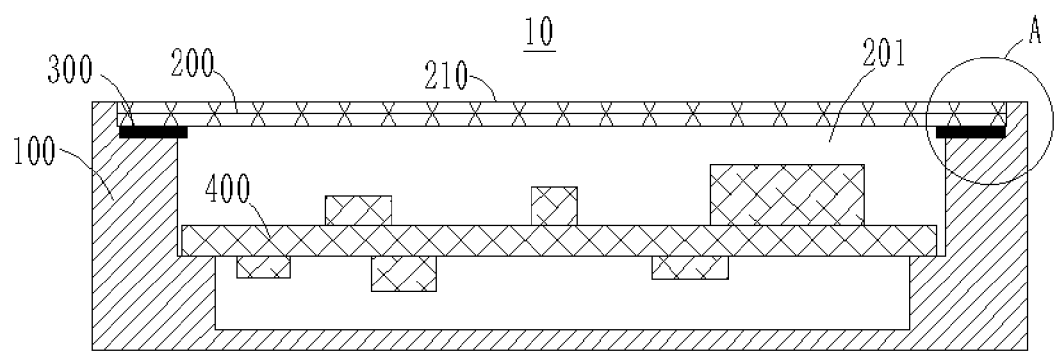
FIG. 4 is a cross-sectional view of an electromagnetic field transceiver device according to another embodiment of the present disclosure.
Figure 5:
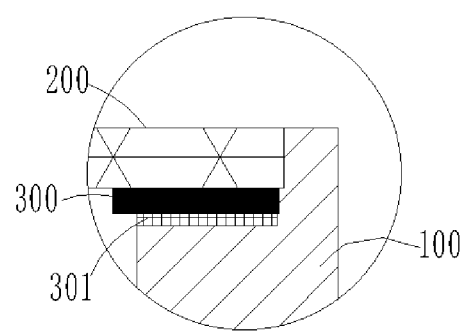
FIG. 5 is an enlarged view of a portion A in FIG. 4.

In an embodiment, as shown in FIGS. 3 and 4, the sealing ring 300 can also be provided at an edge of the opening of the cover body 100. Further, the sealing ring 300 can be directly attached to the side wall of the cover body 100. At the same time, the selective shielding cover 200 can be seamlessly connected to the opening of the cover body 100 relative to the electric field or magnetic field through the sealing ring 300. In an embodiment, the cover body 100 includes at least one side edge forming the opening, and one end of the opening formed by the at least one side edge connected to the sealing ring 300 includes at least one groove. As shown in FIG. 5, a sidestep high outside and low inside (i.e. a groove) is reserved at the edge of the opening of the cover body 100; and the sealing ring 300 and the selective shielding cover 200 are sequentially arranged in the groove, and matched with the cover body 100 to form the cavity 201, so that the electric field and/or the magnetic field inside the cavity can be selected shielded inside the cavity.

It can be understood that the specific structure of the sealing ring 300 is not limited, as long as that the selective shielding cover 200 is seamlessly connected to the opening of the cover body 100 relative to the electric field or the magnetic field through the sealing ring 300. In an embodiment, the structure of the sealing ring 300 can be a mesh structure. By using an electrical convergence area formed by the sealing ring with the mesh structure, not only the sealing effect of the electromagnetic field is guaranteed, but also a stress caused by the full-covering metal layer is reduced.

In an embodiment, the structure of the sealing ring 300 may also be a full-covering structure. By electrically connecting the sealing ring 300 to the cover body 100, while seamlessly connecting the sealing ring 300 to the cover body 100, the gap between the sealing ring 300 and the cover body 100 can be reduced, and then the penetration of the electromagnetic interference is avoided.

It can be understood that the specific structure of the transceiver unit 400 is not limited, as long as the transceiver unit 400 has the function of receiving or transmitting the target electric field and/or the magnetic field through the electromagnetic field transceiver window 210. In an embodiment, the transceiver unit 400 may consist of a coil winding and a substrate. In an embodiment, an area of the electromagnetic field transceiver window 210 of the transceiver unit 400 is smaller than and placed in an area enclosed by the sealing ring 300, so as to prevent the target electric field and/or the target magnetic field from radiating to the sealing ring 300 and other shielding materials and causing an excessive loss and a signal attenuation.

In the embodiment, the selective shielding cover 200 is seamlessly connected to the opening of the cover body 100 relative to the electric field or magnetic field through the sealing ring 300, and forms the cavity capable of shielding the electromagnetic interference other than from the target electromagnetic field 201. At the same time, the selective shielding cover 200 is provided with the electromagnetic field transceiver window 210, and the transceiver unit 400 is provided in the cavity 201, so that the transceiver unit 400 can implement the receiving or transmitting function of the target electric field and/or the target magnetic field in the electromagnetic field transceiver window 210. With the above structure in the embodiment, not only the smooth transmission function of the target electric field and/or the target magnetic field can be implemented, but also an excellent effect of shielding the electromagnetic interference is obtained, accordingly the adaptability is strong.

Figure 6:
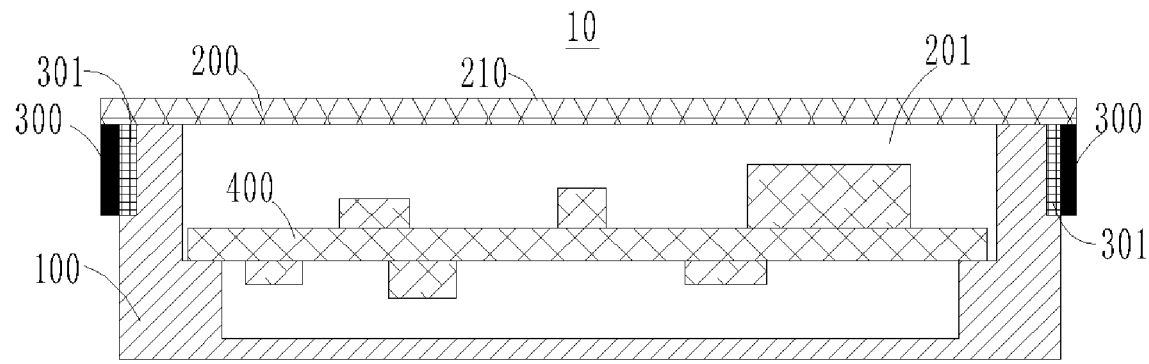
FIG. 6 is a cross-sectional view II of an electromagnetic field transceiver device according to an embodiment of the present disclosure.

Referring to FIGS. 5 and 6, in an embodiment, a conducting layer 301 is provided between the sealing ring 300 and the cover body 100. That is, the conducting layer 301 is added between the sealing ring 300 and the cover body 100, which can make the shielding effect better. In an embodiment, the conducting layer 301 can use a flexible conducting material, such as conductive glue.

In an embodiment, the selective shielding cover 200 is provided with a selective shielding region. The selective shielding region includes at least one metal conductor. One end of each metal conductor is electrically connected to one side of the sealing ring 300. In an embodiment, a shielding pattern formed by the at least one metal conductor in the selective shielding region is not limited, as long as the shielding pattern can implement the shielding function. In an embodiment, the electromagnetic field transceiver window 210 is provided in the selective shielding region, that is, an area of the electromagnetic field transceiver window 210 is smaller than an area of the selective shielding region. In an embodiment, that one end of each metal conductor is electrically connected to one side of the sealing ring 300 refers to: one end of each metal conductor is electrically connected to the sealing ring 300, and the other end of each metal conductor is suspended. When the shape of the sealing ring 300 is non-circular, one end of each metal conductor can be electrically connected to one side of the sealing ring 300.

Figure 7:
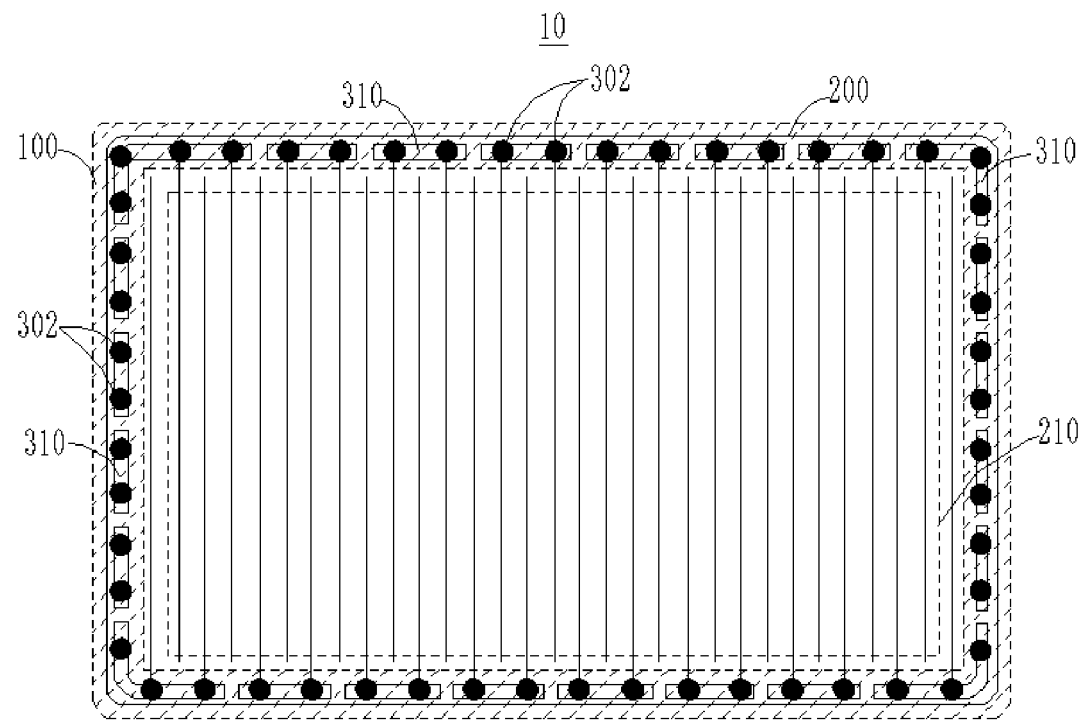
FIG. 7 is a schematic structure diagram I of an electromagnetic field transceiver device according to an embodiment of the present disclosure.

Referring to FIG. 7, in an embodiment, the sealing ring 300 includes: at least two sealing conductive units 310. The at least two sealing conductive units 310 are arranged at intervals, and each of the sealing conductive units 310 is electrically connected to the opening of the cover body 100. Specifically, the sealing conductive unit 310 can be electrically connected to the edge of the opening of the cover body 100 through a conductive junction 302. In an embodiment, the conductive junction 302 can be made of a flexible conductive material, such as conductive glue, etc. In an embodiment, the conductive junction 302 is grounded, which can achieve overall equipotential.

Figure 8:
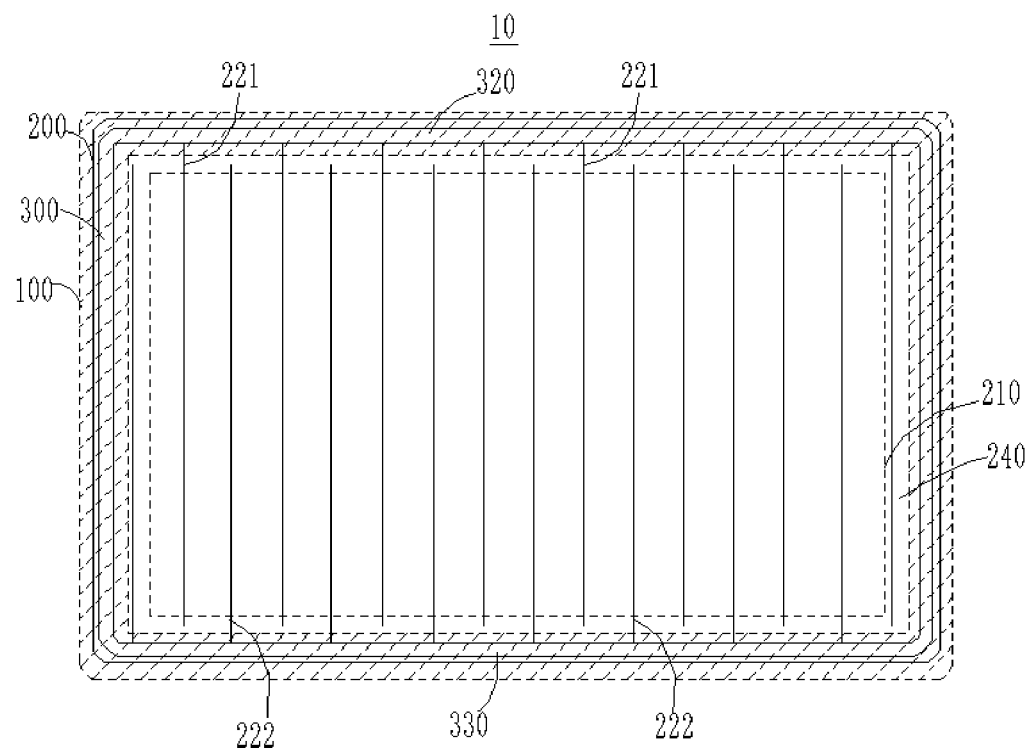
FIG. 8 is a schematic structure diagram II of an electromagnetic field transceiver device according to an embodiment of the present disclosure.

Referring to FIG. 8, in an embodiment, the sealing ring 300 includes a first connecting portion 320 and a second connecting portion 330 which are central symmetric. The selective shielding cover 200 is provided with a selective shielding region. At least one first metal conductor 221 and at least one second metal conductor 222 are further provided on one surface of the selective shielding region. A first end of each first metal conductor 221 is electrically connected to the first connecting portion 320. A second end of each second metal conductor 222 is electrically connected to the second connecting portion 330. The at least one first metal conductor 221 and the at least one second metal conductor 222 are alternately arranged at intervals.

In an embodiment, that at least one first metal conductor 221 and at least one second metal conductor 222 are further provided on one surface of the selective shielding region refers to: at least one first metal conductor 221 and at least one said second metal conductor 222 can be provided on any surface of the selective shielding region. When the first metal conductor 221 and the second metal conductor 222 are both multiple, the first metal conductors 221 and the second metal conductors 222 can be alternately arranged at intervals. At the same time, a first end of each of the first metal conductors 221 is electrically connected to the first connecting portion 320, and a second end of each of the first metal conductors 221 is suspended. A second end of each of the second metal conductors 222 is electrically connected to the second connecting portion 330, and a first end of each of the second metal conductors 222 is suspended. In an embodiment, the first metal conductor 221 and the second metal conductor 222 can be metal conductors, such as iron, aluminum, copper, and the like.

In an embodiment, when the transceiver unit 400 is an electric field transceiver unit, a selective shielding coating 240 can be coated on one surface of the selective shielding cover 200, and the selective shielding coating 240 covers the electromagnetic field transceiver window 210. The selective shielding coating 240 has good magnetic permeability (that is, which can shield the magnetic field) while the electrical conductivity is not good (that is, which can pass through the magnetic field the electric field). In other words, the selective shielding coating 240 can eliminate the magnetic field penetration, and realize the effects that the electric field merely shielded and the magnetic field is almost shielded.

When a large-area magnetic field needs to be shielded, a grounding network consisting of at least one first metal conductor 221 and at least one second metal conductor 222 can be added to the selective shielding coating 240, and is utilized to set the electric potential, so as to reduce the impedance. Further, the total area of an orthographic projection of the grounding network on the selective shielding cover 200 needs to be less than one-tenth of the area of the electromagnetic field transceiver window 210. That is, a width of each metal conductor needs to be less than one-tenth of a width between adjacent metal conductors. Through the cooperation of the grounding network and the selective shielding coating 240, the magnetic field penetration can be eliminated, and the effects that the electric field is merely shielded and the magnetic field is almost shielded are achieved.

Figure 9:
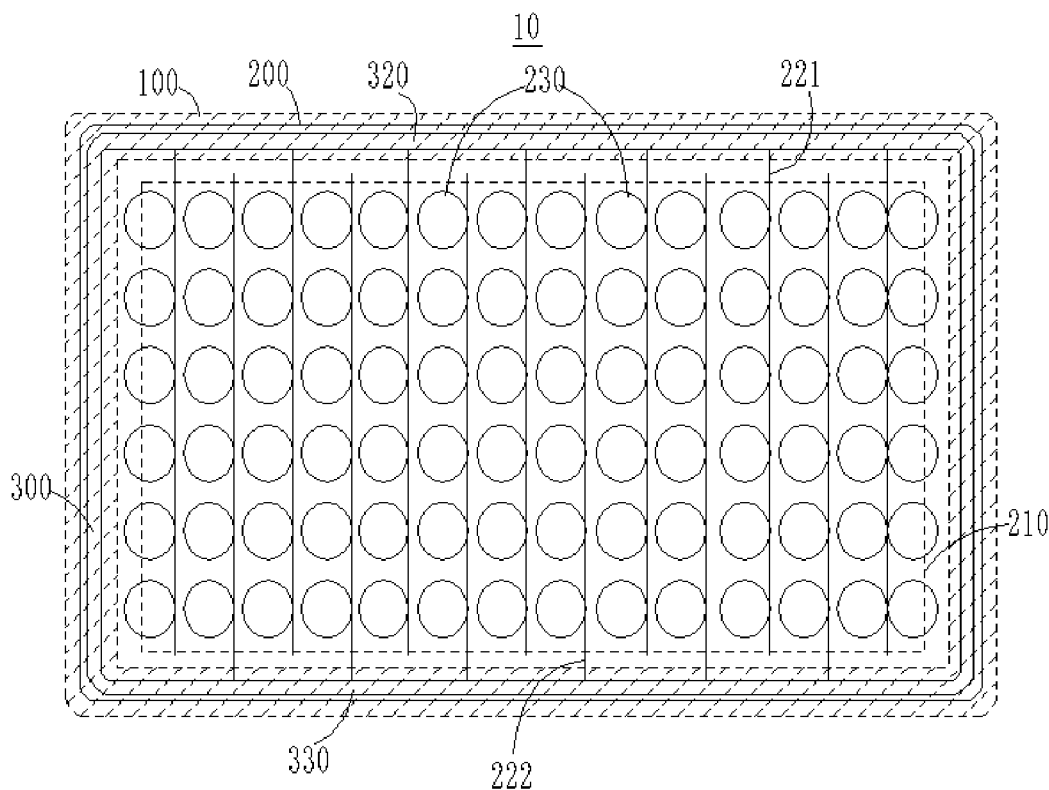
FIG. 9 is a schematic structure diagram III of an electromagnetic field transceiver device according to an embodiment of the present disclosure.

Referring to FIG. 9, in an embodiment, the sealing ring 300 includes a first connecting portion 320 and a second connecting portion 330 which are central symmetric. The selective shielding cover 200 is provided with a selective shielding region. At least one first metal conductor 221, at least one second metal conductor 222, and at least one metal ring 230 arranged in an array are provided on one surface of the selective shielding region, and at least one metal ring 230 in each column is electrically connected to one first metal conductor 221 or one second metal conductor 222. A first end of each of the first metal conductors 221 is electrically connected to the first connecting portion 320. A second end of each of the second metal conductors 222 is electrically connected to the second connecting portion 330, and the at least one first metal conductor 221 and the at least one second metal conductor 222 are alternately arranged at intervals.

In an embodiment, a material of the metal ring 230 can be copper. The at least one metal ring 230 arranged in an array shields the magnetic field, accordingly the magnetic field penetration can be eliminated. In an embodiment, through the cooperation of the at least one metal ring 230 arranged in an array with the at least one first metal conductor 221 and the at least one second metal conductor 222, partial electric field can be shielded while the magnetic field is selectively shielded. Further, a total area of the orthographic projections of the at least one metal ring 230, the at least one first metal conductor 221 and the at least one second metal conductor 222 on the selective shielding cover 200 needs to be less than one-tenth of an area of the electromagnetic field transceiver window 210.

Figure 10:
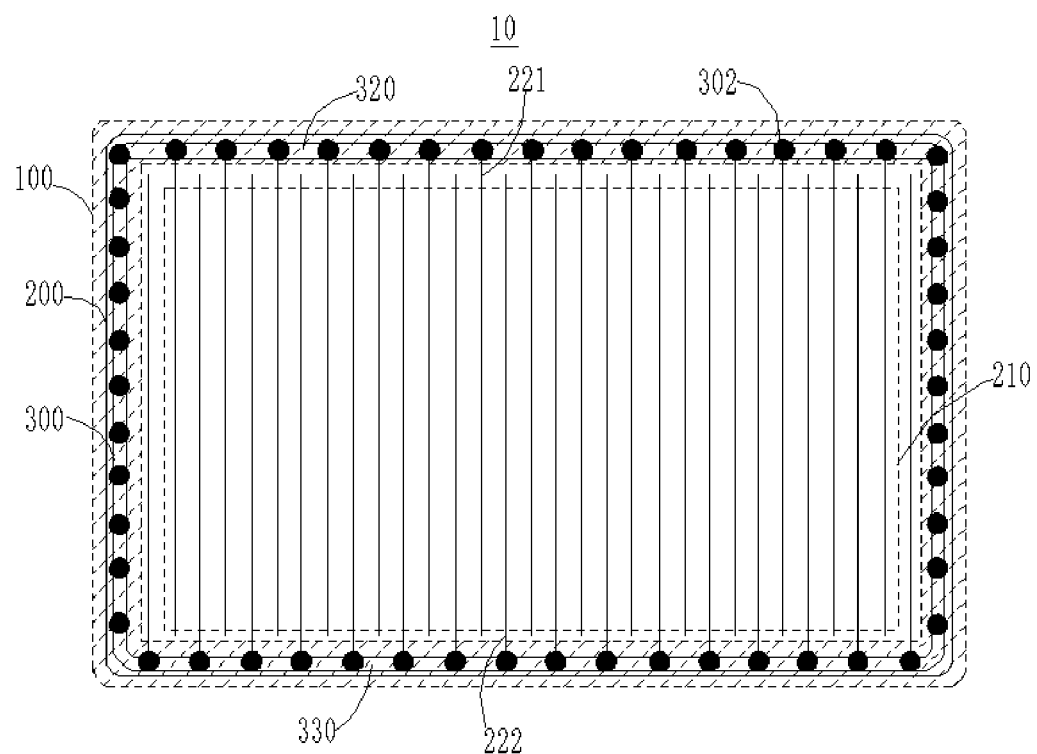
FIG. 10 is a schematic structure diagram IV of an electromagnetic field transceiver device according to an embodiment of the present disclosure.

When the transceiver unit 400 is a magnetic field transceiver unit, referring to FIG. 10, in an embodiment, the sealing ring 300 includes a first connecting portion 320 and a second connecting portion 330 which are central symmetric. The selective shielding cover 200 is provided with a selective shielding region. At least one first metal conductor 221 and at least one second metal conductor 222 are further provided on one surface of the selective shielding region. A first end of each first metal conductor 221 is electrically connected to the first connecting portion 320. A second end of each second metal conductor 222 is electrically connected to the second connecting portion 330. The at least one first metal conductor 221 and the at least one second metal conductor 222 are alternately arranged at intervals.

In an embodiment, the widths of the first metal conductor 221 and the second metal conductor 222 are between a skin depth of one target electromagnetic field and a skin depth of three target electromagnetic fields, and preferably between a skin depth of two target electromagnetic fields and a skin depth of three target electromagnetic fields. The use of such a width for each metal conductor can hardly lose the frequency band of the target magnetic field, and can further significantly attenuate the high-frequency magnetic field, thereby achieving the effects that the magnetic field is selectively passed through and the electric field is shielded. In an embodiment, a width between the metal conductors can be determined according to actual economy and process, but the smaller the width, the better, so as to obtain the largest possible shielding region. In an embodiment, each of the first metal conductors 221 is grounded through the first connecting portion 320; each of the second metal conductors 222 is grounded through the second connecting portion 330. Each first metal conductor and each second metal conductor are spaced and respectively grounded at two sides through the first connecting portion 320 and the second connecting portion 330, accordingly the collection and grounding impedance is reduced.

Referring to FIGS. 11 to 14, in an embodiment, the selective shielding cover 200 is provided with a selective shielding region. At least one first metal conductor 221 or second metal conductor 222 is provided at intervals on one surface of the selective shielding region. At least one spacing region 223 is provided in the selective shielding pattern formed by the at least one first metal conductor 221 or second metal conductor 222. One end of each of the first metal conductors 221 or the second metal conductors 222 is electrically connected to the sealing ring 300. The other end of each of the first metal conductors 221 or the second metal conductors 222 is suspended in the spacing region 223. In an embodiment, a shape of the spacing region 223 is a straight line, a curved line or a broken line.

Figure 11:
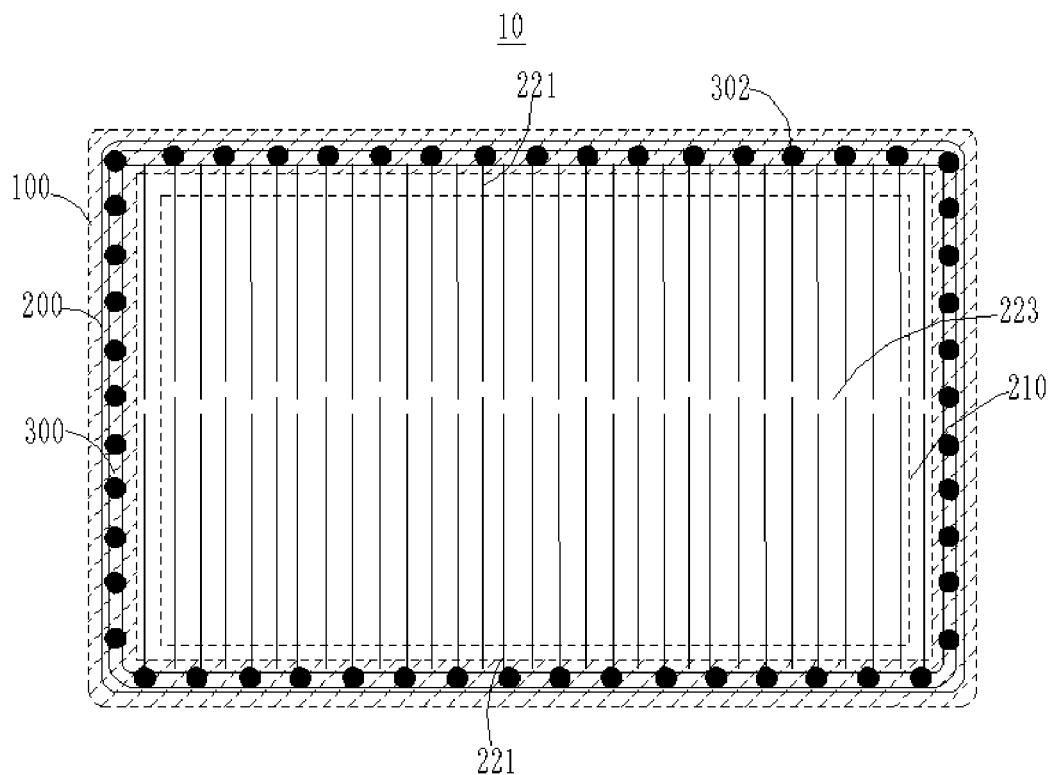
FIG. 11 is a schematic structure diagram V of an electromagnetic field transceiver device according to an embodiment of the present disclosure.

In an embodiment, a length of each metal conductor in FIG. 11 is approximately equal to half the width of the cover body 100, meanwhile the metal conductors are grounded on the opposite two sides of the sealing ring 300 in parallel, so that nearly half the grounding impedance of each metal conductor is reduced on the basis of FIG. 10. The length of each metal conductor in FIG. 12 is approximately equal to half the width of the cover body 100, meanwhile each metal conductor is grounded on respective four sides of the sealing ring 300 in parallel, so that the collection and grounding impedance of the metal conductor is further reduced on the basis of FIG. 11.

Figure 12:
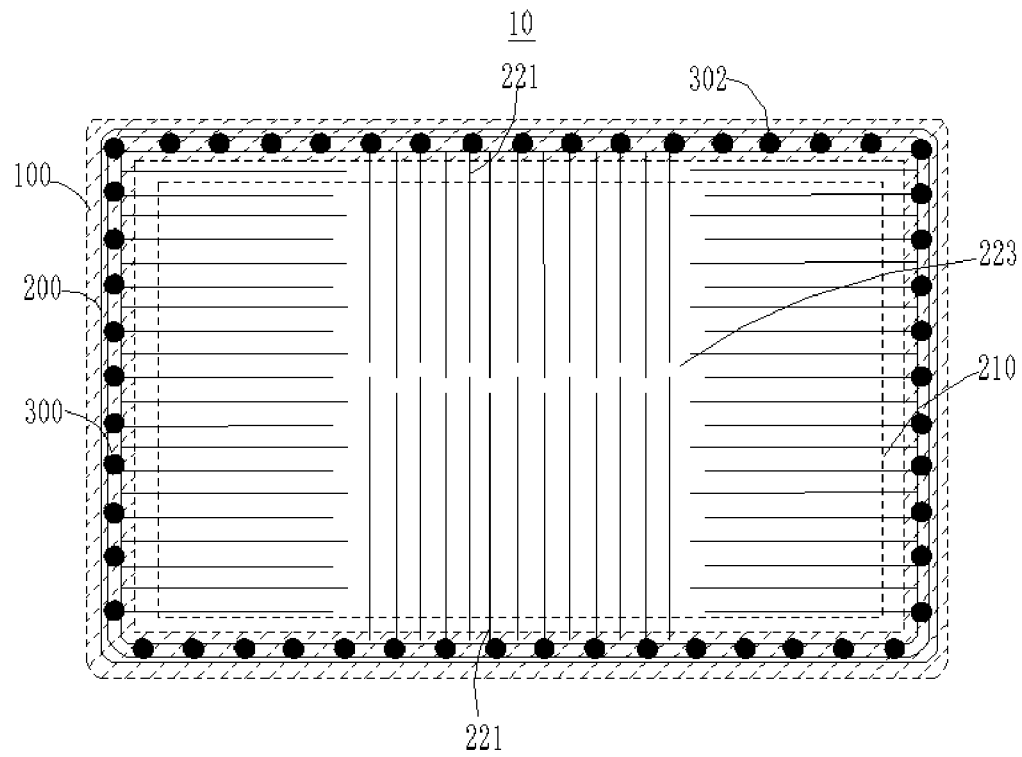
FIG. 12 is a schematic structure diagram VI of an electromagnetic field transceiver device according to an embodiment of the present disclosure.
Figure 13:
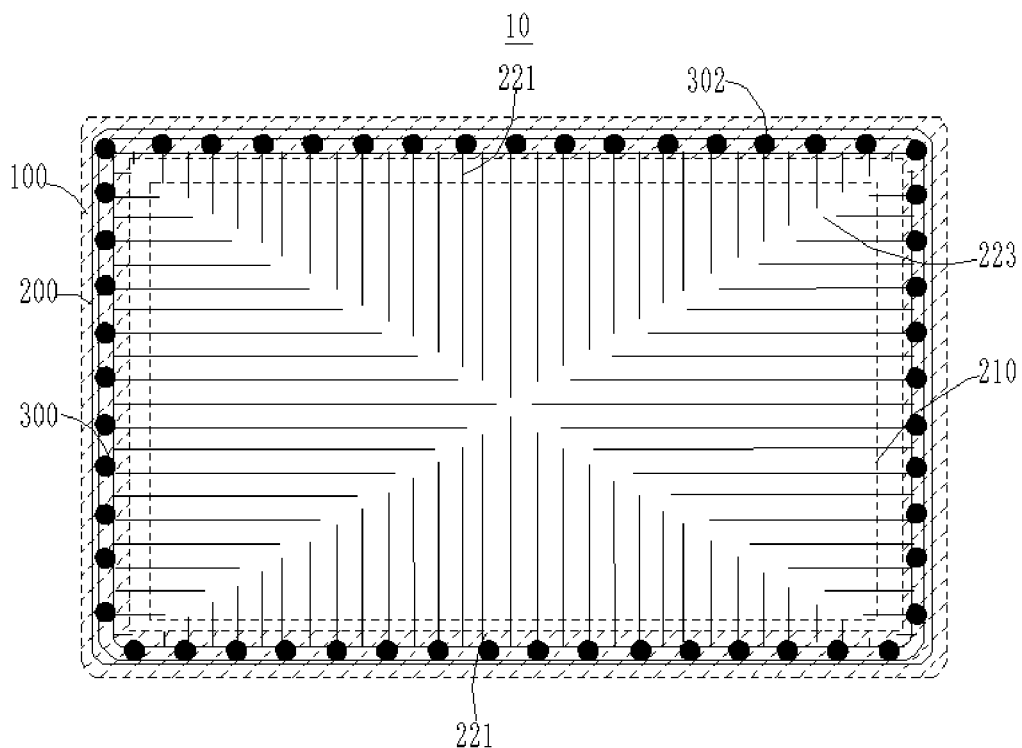
FIG. 13 is a schematic structure diagram VII of an electromagnetic field transceiver device according to an embodiment of the present disclosure.
Figure 14:
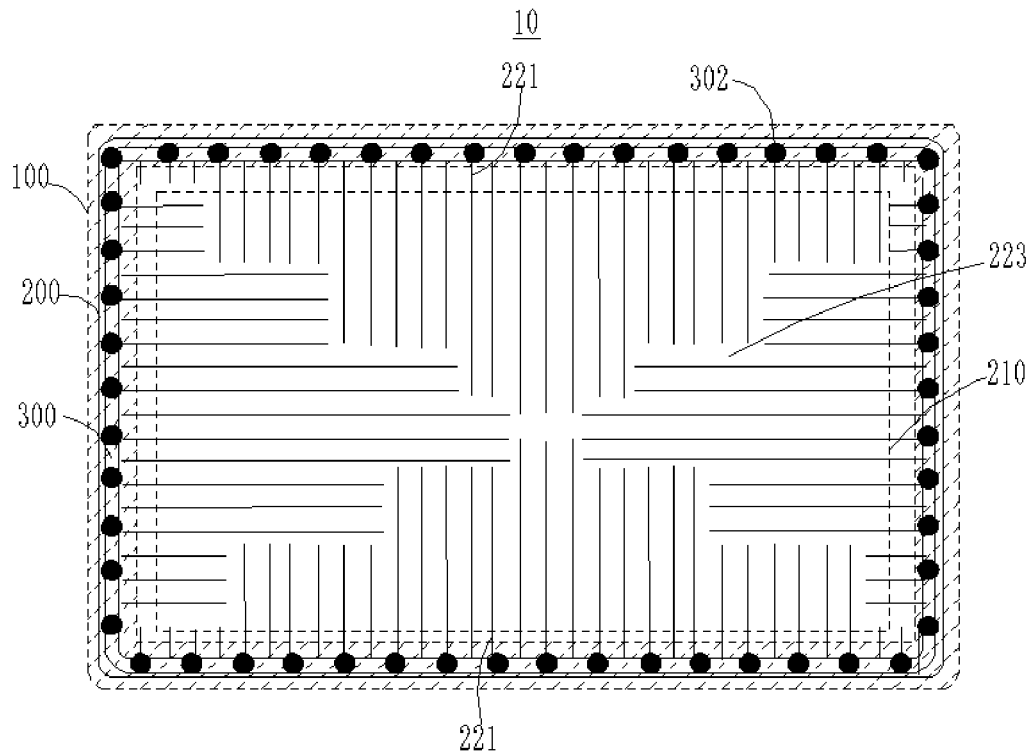
FIG. 14 is a schematic structure diagram VIII of an electromagnetic field transceiver device according to an embodiment of the present disclosure.

In FIG. 13 based on FIG. 12, a diagonal passing through the center point of the selective shielding cover 200 is taken as spacing regions 223, so that the longest length of the metal conductors is approximately equal to half the length of the selective shielding cover 200, meanwhile the lengths of the other metal conductors are gradually reduced relative to the longest length of the metal conductors, so that the overall grounding impedance is lower. In FIG. 14 based on FIG. 13, the spacing region 223 of the metal conductors is arranged in a curved line or a broken line, so as to prevent a long-length parting line from leaking the target electric field and/or the target magnetic.

Figure 15:
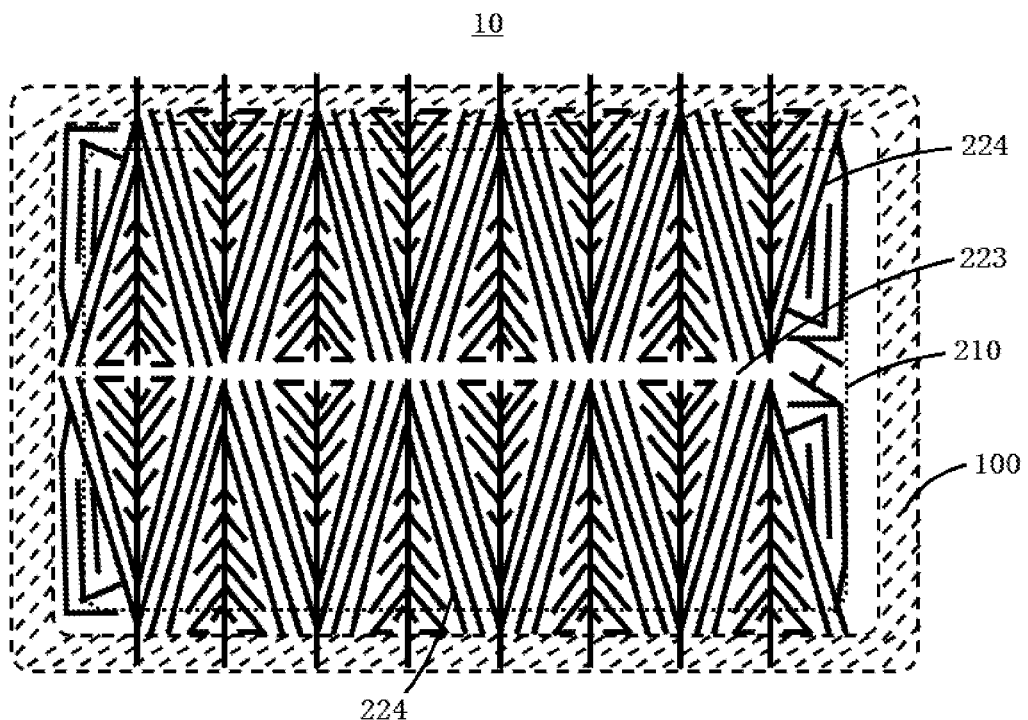
FIG. 15 is a schematic structure diagram IX of an electromagnetic field transceiver device according to an embodiment of the present disclosure.

Referring to FIG. 15, in an embodiment, a third metal conductor 224 is further provided on a surface of the selective shielding region. One end of each third metal conductor 224 is electrically connected to the first metal conductor 221 or the second metal conductor 222. Through the cooperation of the third metal conductor 224 with the first metal conductor 221 or the second metal conductor 222, the effects that the magnetic field is selectively passed through and the electric field is shielded can also be achieved. In an embodiment, a material of the third metal conductor 224 is the same as that of the first metal conductor 221 or the second metal conductor 222.

Figure 16:
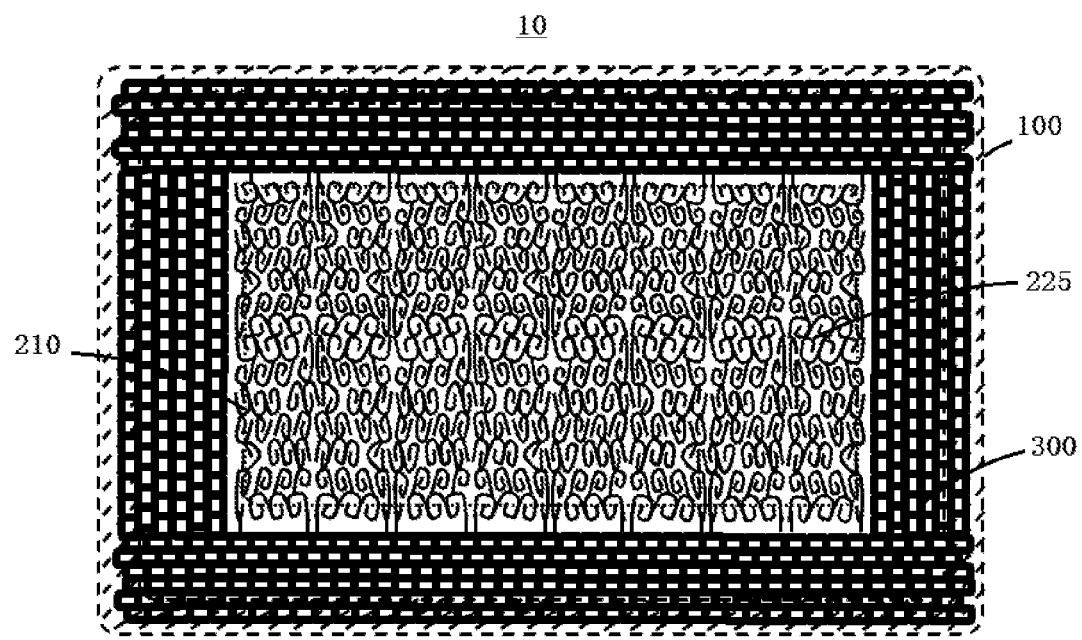
FIG. 16 is a schematic structure diagram X of an electromagnetic field transceiver device according to an embodiment of the present disclosure.

Referring to FIG. 16, in an embodiment, the selective shielding cover 200 is provided with a selective shielding region. At least one fourth metal conductor 225 which is non-closed and curled is provided at intervals on a surface of the selective shielding region. One end of each fourth metal conductor 225 is electrically connected to the sealing ring 300, and/or one end of each fourth metal conductor 225 is electrically connected to the sealing ring 300 through another fourth metal conductor 225. In an embodiment, a material of the fourth metal conductor 225 is the same as that of the first metal conductor 221. By using at least one fourth metal conductor 225 which is non-closed and curled in the selective shielding region, the effects that the magnetic field is selectively passed through and the electric field is shielded can also be achieved.

Figure 17:
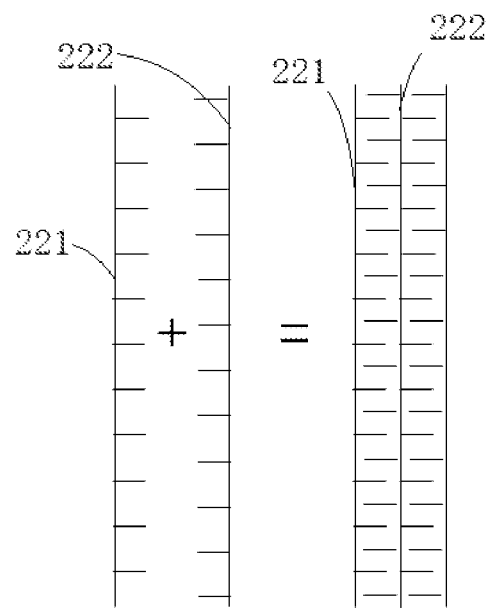
FIG. 17 is a schematic structure diagram I of a first metal conductor and a second metal conductor according to an embodiment of the present disclosure.
Figure 18:
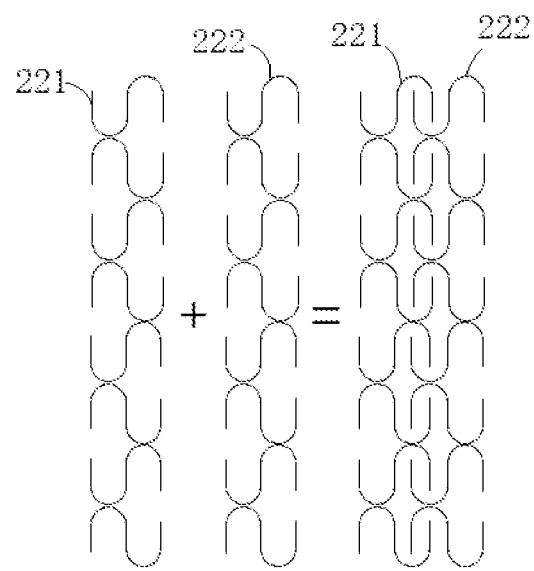
FIG. 18 is a schematic structure diagram II of a first metal conductor and a second metal conductor according to an embodiment of the present disclosure.
Figure 19:
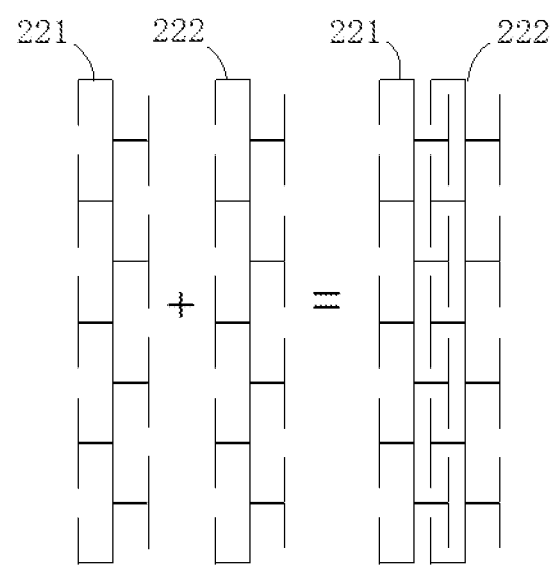
FIG. 19 is a schematic structure diagram III of a first metal conductor and a second metal conductor according to an embodiment of the present disclosure.

In an embodiment, the sealing ring 300 includes a first connecting portion 320 and a second connecting portion 330 which are central symmetric. The selective shielding cover 200 is provided with a selective shielding region. At least one first metal conductor 221 and at least one second metal conductor 222 are provided on one surface of the selective shielding region. The first metal conductor 221 and the second metal conductor 222 are at least partially fitted with each other. As shown in FIGS. 17 to 19, the first metal conductor 221 and the second metal conductor 222 having a shape of a coordinate axis type (FIG. 17), an S type (FIG. 18) or a digital type (FIG. 19) are fitted with each other, and the effects that the magnetic field is selectively passed through and the electric field is shielded can also be achieved. Compared to the selective shielding pattern consisting of parallel straight lines/curved lines, the use of the above described selective shielding patterns fitted with each other can greatly reduce the non-conductive gaps in any direction, and there is little difference between grounding resistance of each region and the parallel straight lines.

Figure 20:
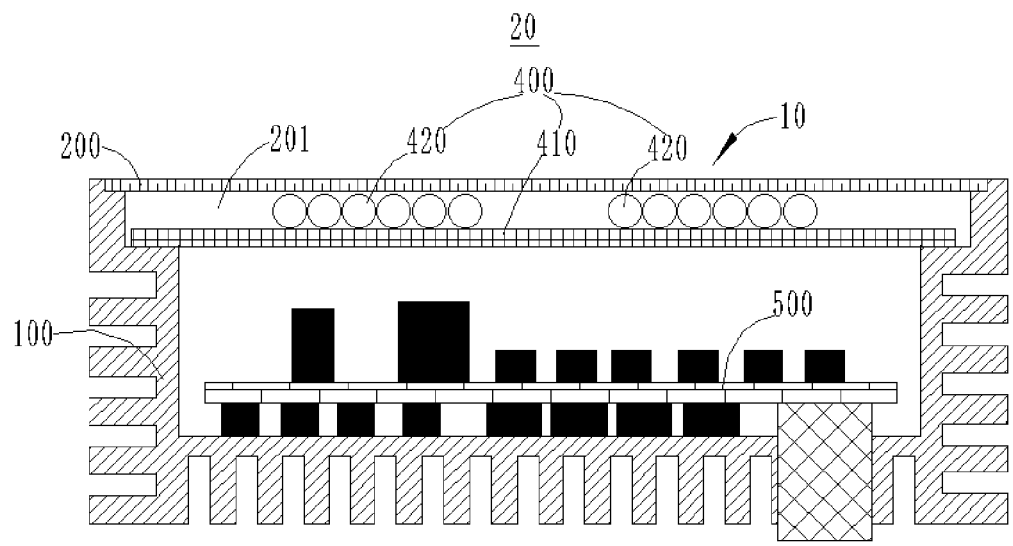
FIG. 20 is a schematic structure diagram I of a wireless charging device according to an embodiment of the present disclosure.

Referring to FIG. 20, another embodiment of the present disclosure provides a wireless charging device 20, which includes the electromagnetic field transceiver device 10 described in any of the above embodiments and a driving circuit 500. The selective shielding cover 200 and the sealing ring 300 are seamlessly connected to the opening of the cover body 100. The driving circuit 500 is provided in the cavity 201. The driving circuit 500 is electrically connected to the transceiver unit 400. The driving circuit 500 is configured to drive the transceiver unit 400 to receive or transmit the target electric field and/or the magnetic field through the electromagnetic field transceiver window 210. In an embodiment, the wireless charging device 20 can be applied to charge an intelligent electronic device. The intelligent electronic device can be a mobile phone or a smart watch with a wireless charging function.

It can be understood that the sealing manner in which the selective shielding cover 200 and the sealing ring 300 are connected to the opening of the cover body 100 is not limited, as long as the sealing between the selective shielding cover 200 as well as the sealing ring 300 and the opening of the cover body 100 is guaranteed. In an embodiment, the selective shielding cover 200 and the sealing ring 300 can be sealed with the opening of the cover body 100 by a sealant. In an embodiment, the selective shielding cover 200 and the sealing ring 300 can also be sealed with the opening of the cover body 100 by a rubber ring. By sealing the selective shielding cover 200 and the sealing ring 300 with the opening of the cover body 100, waterproof and dustproof effects can be achieved.

It can be understood that a specific circuit structure of the driving circuit 500 is not limited, as long as it has the function of driving the transceiver unit 400 to receive or transmit the target electric field and/or the magnetic field through the electromagnetic field transceiver window 210. In an embodiment, the driving circuit 500 can be a conventional driving chip having a function of driving the transceiver unit 400 to receive or transmit the target electromagnetic field.

In an embodiment, the transceiver unit 400 includes a substrate 410 and a coil winding 420. The substrate 410 is fixed in the cavity 201. The coil winding 420 is fixed on a side of the substrate 410 facing the selective shielding cover 200. The coil winding 420 is electrically connected to the driving circuit 500. The coil winding 420 is configured to receive or transmit the target electric field and/or the magnetic field through the electromagnetic field transceiver window 210.

In an embodiment, the substrate 410 can be a magnetic substrate. In an embodiment, the coil winding 420 can be attached with the selective shielding cover 200, so as to reduce an outward transmission distance as much as possible, thereby improving the wireless charging efficiency for the intelligent electronic device. Specifically, the coil winding 420 can be fitted with the electromagnetic field transceiver window 210, so that the outward transmission distance of the coil winding 420 is reduced as much as possible. In an embodiment, the coil winding 420 can consist of a plurality of coils.

In an embodiment, the selective shielding cover 200 is provided with a selective shielding region. The selective shielding region covers an orthographic projection of the coil winding 420 on the selective shielding cover 200. Specifically, a shielding pattern of the selective shielding region can be the pattern described in the above described embodiments, which will not be repeated here. With the selective shielding region covering the orthographic projection of the coil winding 420 on the selective shielding cover 200, the coil winding 420 can shield a corresponding electromagnetic interference when receiving or transmitting the target electric field and/or the magnetic field.

Figure 21:
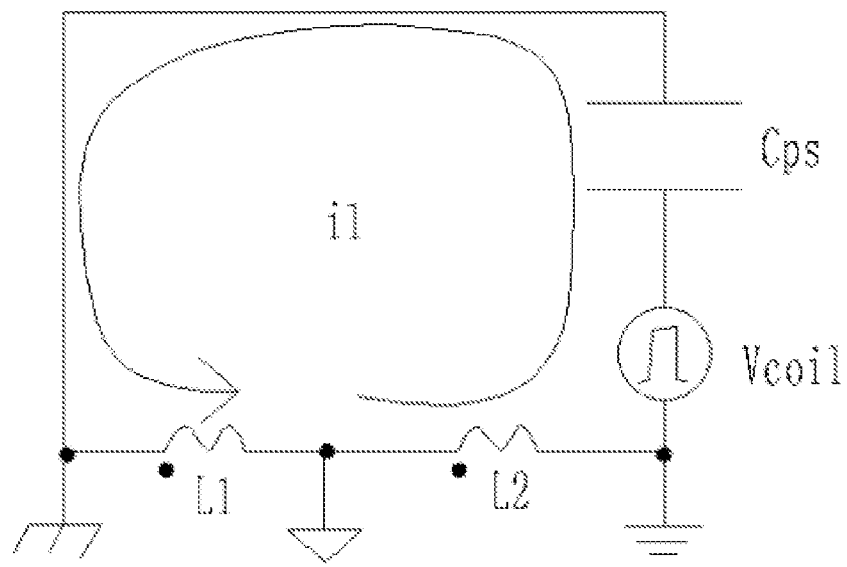
FIG. 21 is a schematic diagram of a conventional wireless charging common-mode noise circuit according to an embodiment of the present disclosure.

As shown in FIG. 21, which is a conventional wireless charging common-mode noise model, a voltage jump of the transmitting coil (i.e., the coil winding 420) is large, which is equivalent to Vcoil. Due to a large area of the transmitting coil, there is an obvious distributed capacitance Cps on a car body and a negative terminal of a battery. There is an equivalent inductance L1 between the battery and the wireless charging input line. The shell is connected to the wireless charging device input terminal ground. There is a common-mode inductance L2 between the wireless charging device input terminal and an internal converter power ground. Accordingly, the common-mode noise can be obtained by measuring the current on L1. With reference to FIG. 21, it can be seen that in this solution, Vcoil can form a larger common-mode current i1 through Cps.

Figure 22:
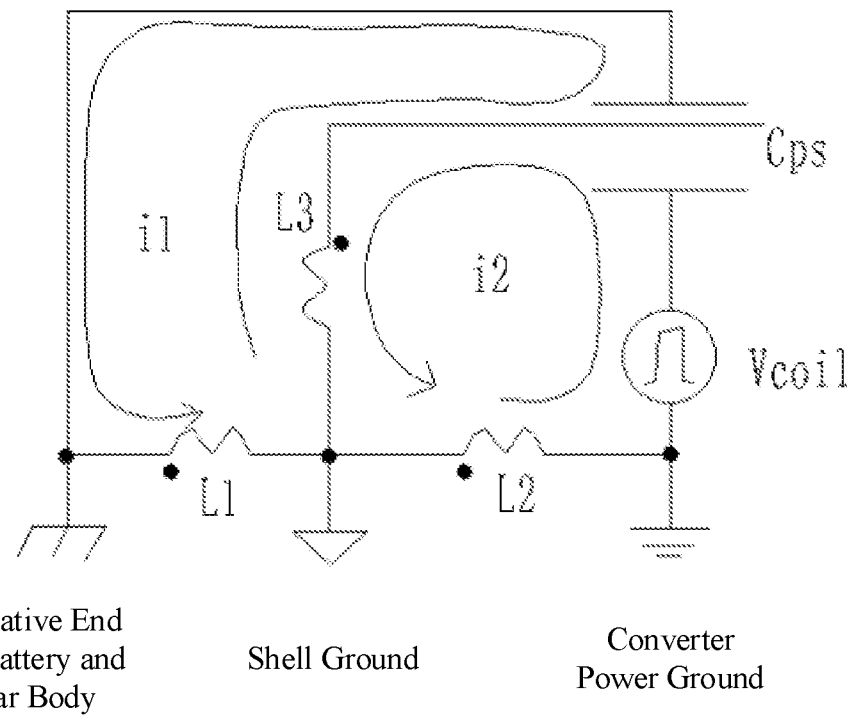
FIG. 22 is a schematic diagram I of a wireless charging common-mode noise circuit according to an embodiment of the present disclosure.

As shown in FIG. 22, through the selective shielding cover 200, the wireless charging device 20 adds a partition in the Cps while sealing part of the magnetic field, so that the Cps is divided into two parts. One part of the Cps becomes the capacitance between the coil winding 420 and the selective shielding cover 200, and the other part of the Cps is the capacitance of the selective shielding cover 200 relative to the vehicle body. With reference to FIG. 22, it can be seen that most of the common-mode energy of Vcoil is consumed by a cycle of a current i2 inside the shielding loop formed by the selective shielding cover 200 and the cover body 100. Compared to the solution shown in FIG. 21, the common-mode current i1 flowing through L1 is greatly reduced in the solution shown in FIG. 22.

Figure 23:
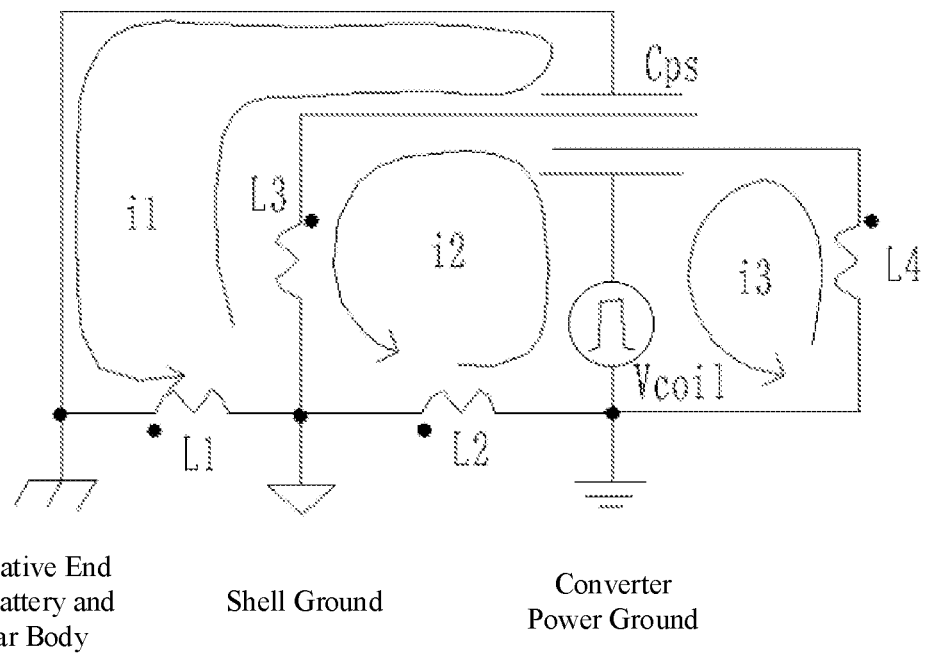
FIG. 23 is a schematic diagram II of a wireless charging common-mode noise circuit according to an embodiment of the present disclosure.
Figure 24:
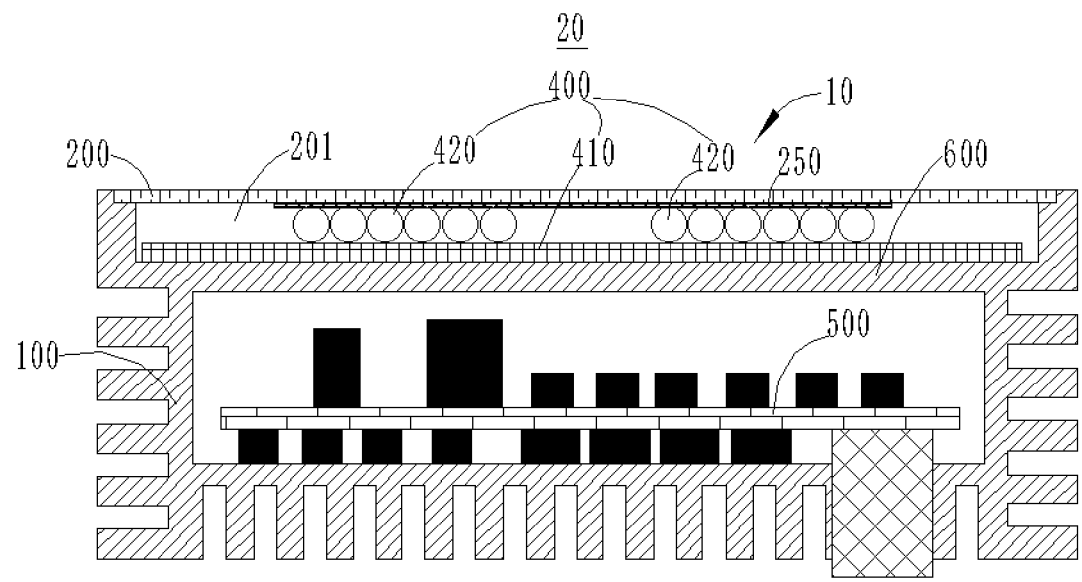
FIG. 24 is a schematic structure diagram II of a wireless charging device according to an embodiment of the present disclosure.

As shown in FIG. 23 based on the solution shown in FIG. 22, an additional shielding layer 250 is provided between the selective shielding cover 200 and the coil winding 420. Specifically, as shown in FIG. 24, an additional shielding layer 250 is provided on a surface of a side of the selective shielding cover 200 facing the cover body 100, and at least part of an orthographic projection of the additional shielding layer 250 on the substrate 410 coincides with the orthographic projection of the coil winding 420 on the substrate 410. The additional shielding layer 250 is added between the selective shielding cover 200 and the coil winding 420, and the additional shielding layer 250 is directly connected to the power ground. In such a way, most of the common-mode current can be consumed by a cycle of a current i3 inside the wireless charging device 20, so that the common-mode current flowing through the L1 can be minimized.

Figure 25:
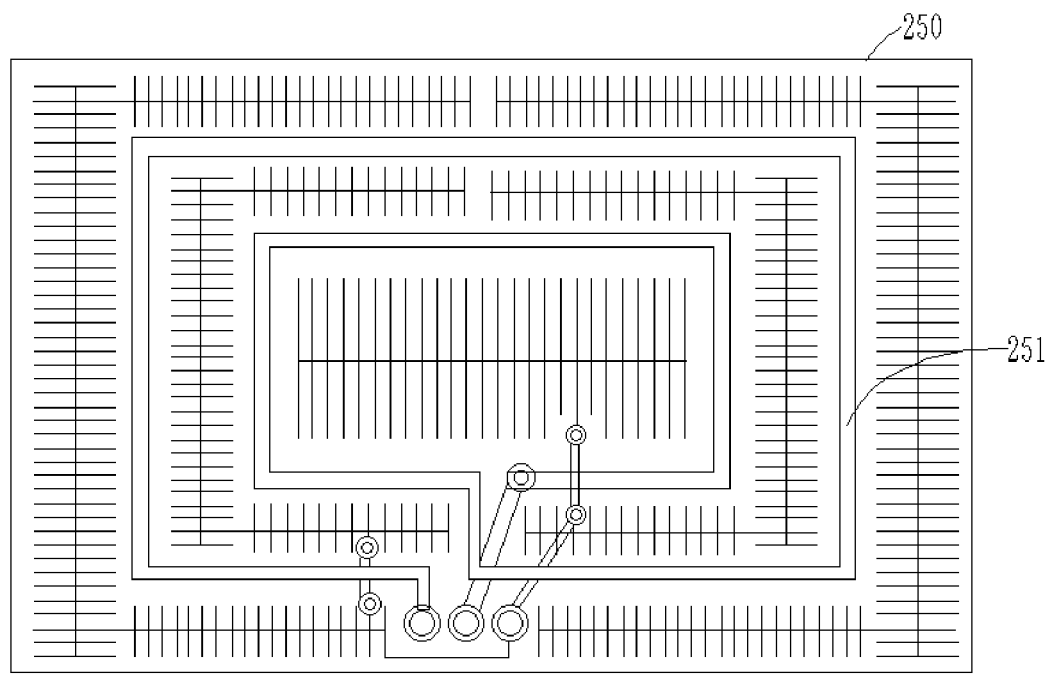
FIG. 25 is a schematic structure diagram of an additional shielding layer according to an embodiment of the present disclosure.

In an embodiment, the additional shielding layer 250 can have a multi-layer structure. At the same time, a surface of the additional shielding layer 250 can have the shielding pattern in the selective shielding region described in the above embodiments. In an embodiment, as shown in FIG. 25, the additional shielding layer 250 can further be provided with a near-field communication line and/or a thermistor temperature sampling line 251. Specifically, the near-field communication line can be an NFC coil, and the thermistor temperature sampling line can be an NFC temperature sampling coil.

In an embodiment, the near-field communication line and/or the thermistor temperature sampling line 251 integration in the additional shielding layer 250 should not form a loop as far as possible; and at the same time, these lines are electric connected to the power ground, thereby achieving the shielding of the electric field of the additional shielding layer 250. In an embodiment, when the near-field communication line and/or the thermistor temperature sampling line 251 are electric connected to grounded, if they conflict with other lines, they can be crossed via holes. The near-field communication line and/or the thermistor temperature sampling line 251 are integration in the additional shielding layer 250, accordingly the cost can be saved.

Figure 26:
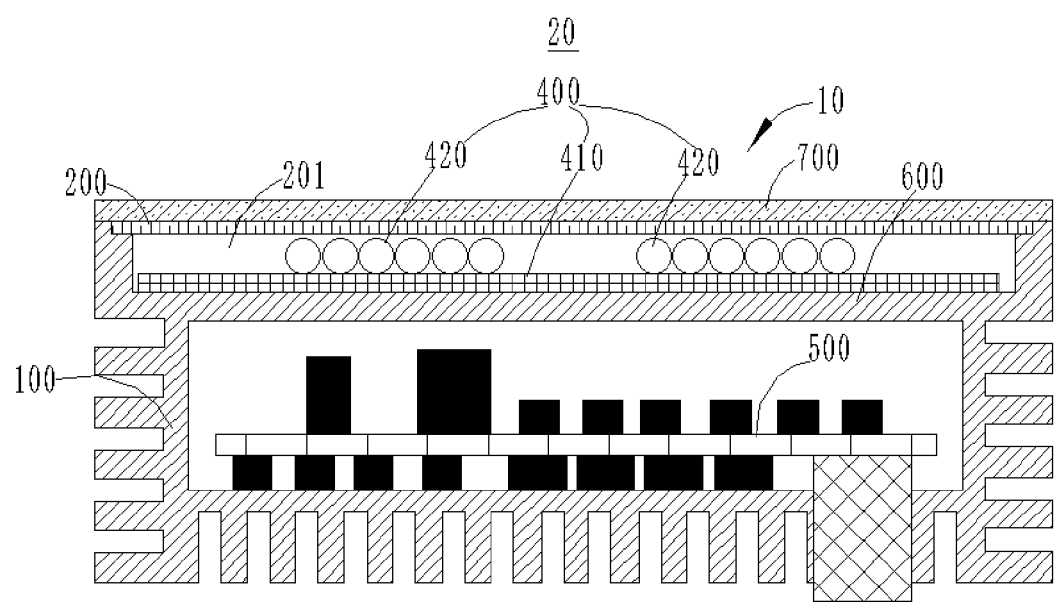
FIG. 26 is a schematic structure diagram III of a wireless charging device according to an embodiment of the present disclosure.

Referring to FIG. 26, in an embodiment, the wireless charging device 20 further includes a heat conducting support plate 600. The heat conducting support plate 600 is provided in the cavity 201. The heat conducting support plate 600 is fixedly connected to the cover body 100. The heat conducting support plate 600 is attached to a side of the substrate 410 away from the coil winding 420. In an embodiment, the heat conducting support plate 600 and the cover body 100 can be formed in one piece. In an embodiment, the heat conducting support plate 600 can be pasted to the side of the substrate 410 away from the coil winding 420 by glue. The heat in the cavity 201 and the heat generated by the coil winding 420 when receiving or transmitting the target electric field and/or the magnetic field are directed conducted to the cover body 100 through the heat conducting support plate 600, so as to dissipate the heat through heat dissipation fins provided on the cover body 100.

In an embodiment, the wireless charging device 20 further includes a cover plate 700. The cover plate 700 is connected to the opening of the cover body 100 in a sealing manner. The cover plate 700 is attached to a side of the selective shielding cover 200 away from the transceiver unit 400. In an embodiment, the cover plate 700 can be made of a non-conductive material, such as a plastic. In an embodiment, the cover plate 700 can be sealed with the opening of the cover body 100 by a sealant to achieve waterproof and dustproof effects.

In conclusion, the selective shielding cover 200 in the present disclosure is seamlessly connected to the opening of the cover body 100 relative to the electric field or the magnetic field through the sealing ring 300, and forms a closed cavity 201 capable of shielding an electromagnetic interference other than the target electric field and/or the magnetic field. At the same time, the selective shielding cover 200 is provided with the electromagnetic field transceiver window 210, and the transceiver unit 400 is provided in the cavity 201, so that the transceiver unit 400 can receive or transmit the target electric field and/or the magnetic field through the electromagnetic field transceiver window 210. With the above structure, the present disclosure can not only realize the smooth transmission function of the target electric field and/or the magnetic field, but also has an excellent effect of shielding the electromagnetic interference, and has a strong adaptability.

The technical features of the above-described embodiments can be combined arbitrarily. To simplify the description, all possible combinations of the technical features in the above embodiments are not described. However, all of the combinations of these technical features should be considered as within the scope of the present disclosure, as long as there is no contradiction among such combinations.

The above-described embodiments are merely several embodiments of the present disclosure, and the description thereof is more specific and detailed, but it should not be construed as limiting the scope of the present disclosure. It should be noted that, several variations and improvements can be made by those of ordinary skill in the art without departing from the concept of the present disclosure, and these are all within the protection scope of the present disclosure. Therefore, the protection scope of the present disclosure shall be subject to the appended claims.

What is claimed is:

1. An electromagnetic field transceiver device, comprising:
   a cover body;
   a selective shielding cover, provided with an electromagnetic field transceiver window which selectively shields an electric field and/or a magnetic field;
   a sealing ring, the selective shielding cover being seamlessly connected to an opening of the cover body relative to the electric field or the magnetic field through the sealing ring, the selective shielding cover and the cover body forming a cavity, the sealing ring being electrically connected to the selective shielding cover, and the sealing ring enclosing the electromagnetic field transceiver window; and
   a transceiver unit, provided in the cavity and configured to receive or transmit a target electric field and/or the magnetic field;
   wherein the sealing ring comprises:
   at least two sealed conductive units, which are arranged at intervals, and each of which is electrically connected to the opening of the cover body,
   wherein the sealed conductive unit is electrically connected to an edge of the opening of the cover body through a conductive junction, the conductive junction being grounded.

2. The electromagnetic field transceiver device of claim 1, wherein the sealing ring sleeve the cover body.

3. The electromagnetic field transceiver device of claim 1, wherein the cover body comprises at least one side edge forming the opening, and one end of the at least one side edge connected to the sealing ring comprises at least one groove.

4. The electromagnetic field transceiver device of claim 1, wherein the selective shielding cover is provided with a selective shielding region, the selective shielding region comprises at least one metal conductor, and one end of each metal conductor is electrically connected to one side edge of the sealing ring.

5. The electromagnetic field transceiver device of claim 1, wherein a conducting layer is provided between the sealing ring and the cover body.

6. The electromagnetic field transceiver device of claim 1, wherein a selective shielding coating is coated on a surface of the selective shielding cover, and the selective shielding coating covers the electromagnetic field transceiver window.

7. The electromagnetic field transceiver device of claim 1, wherein the sealing ring comprises a first connecting portion, and a second connecting portion which are central symmetric;
   the selective shielding cover is provided with a selective shielding region, on a surface of the selective shielding region are provided at least one first metal conductor and at least one second metal conductor, a first end of each first metal conductor is electrically connected to the first connecting portion, a second end of each second metal conductor is electrically connected to the second connecting portion, and the at least one first metal conductor and the at least one second metal conductor are alternately arranged at intervals.

8. The electromagnetic field transceiver device of claim 7, wherein a total area of orthographic projections of the at least one first metal conductor and the at least one second metal conductor on the selective shielding cover is less than one tenth of an area of the electromagnetic field transceiver window.

9. The electromagnetic field transceiver device of claim 1, wherein the sealing ring comprises a first connecting portion, and a second connecting portion which are central symmetric;
   the selective shielding cover is provided with a selective shielding region, on a surface of the selective shielding region are provided at least one first metal conductor, at least one second metal conductor, and at least one metal ring which is arranged in an array, and the at least one metal ring in each column is electrically connected to one first metal conductor or one second metal conductor, a first end of each first metal conductor is electrically connected to the first connecting portion, a second end of each second metal conductor is electrically connected to the second connecting portion, and the at least one first metal conductor and the at least one second metal conductor are alternately arranged at intervals.

10. The electromagnetic field transceiver device of claim 9, wherein a total area of orthographic projections of the at least one metal ring, the at least one first metal conductor and the at least one second metal conductor on the selective shielding cover is less than one tenth of an area of the electromagnetic field transceiver window.

11. The electromagnetic field transceiver device of claim 1, wherein the selective shielding cover is provided with a selective shielding region, on a surface of the selective shielding region are provided at least one first metal conductor or at least one second metal conductor arranged at intervals, at least one spacing region is provided in a selective shielding pattern formed by the at least one first metal conductor or the at least one second metal conductor, one end of each first metal conductor or each second metal conductor is electrically connected to the sealing ring, and the other end of each first metal conductor or each second metal conductor is suspended in the spacing region.

12. The electromagnetic field transceiver device of claim 11, wherein a third metal conductor is further provided on a surface of the selective shielding region, one end of each third metal conductor is electrically connected to a first metal conductor or a second metal conductor.

13. The electromagnetic field transceiver device of claim 1, wherein the selective shielding cover is provided with a selective shielding region, on a surface of the selective shielding region are provided at least one non-closed curled fourth metal conductor arranged at intervals, and one end of each fourth metal conductor is electrically connected to the sealing ring, and/or, one end of each fourth metal conductor is electrically connected to the sealing ring through another fourth metal conductor.

14. The electromagnetic field transceiver device of claim 1, wherein the sealing ring comprises a first connecting portion, and a second connecting portion which are central symmetric;
   the selective shielding cover is provided with a selective shielding region, on a surface of the selective shielding region are provided at least one first metal conductor and at least one second metal conductor, and the at least one first metal conductor and the at least one second metal conductor are at least partially fitted with each other.

15. A wireless charging device, comprising: the electromagnetic field transceiver device of claim 1, wherein the selective shielding cover is connected to the opening of the cover body in a sealing manner; and a driving circuit, provided in the cavity and electrically connected to the transceiver unit, and configured to drive the transceiver unit to receive or transmit the target electric field and/or the magnetic field through the electromagnetic field transceiver window.

16. The wireless charging device of claim 15, wherein the transceiver unit comprises:

a substrate, fixed in the cavity; and a coil winding, fixed on a side of the substrate facing the selective shielding cover and electrically connected to the driving circuit, and configured to receive or transmit the target electric field and/or the magnetic field through the electromagnetic field transceiver window.

17. The wireless charging device of claim 16, wherein the selective shielding cover is provided with a selective shielding region, and the selective shielding region covers an orthographic projection of the coil winding on the selective shielding cover.

18. The wireless charging device of claim 16, wherein an additional shielding layer is provided on a surface of a side of the selective shielding cover facing the cover body, and at least part of an orthographic projection of the additional shielding layer on the substrate coincides with an orthographic projection of the coil winding on the substrate.

19. The wireless charging device of claim 18, wherein the additional shielding layer is provided with a near-field communication line and/or a thermistor temperature sampling line.

20. The wireless charging device of claim 16, further comprising:

a heat conducting support plate, provided in the cavity and fixedly connected to the cover body, and attached to a side of the substrate away from the coil winding.

\* \* \* \* \*